US006888672B2

(12) United States Patent
Wise

(10) Patent No.: US 6,888,672 B2
(45) Date of Patent: May 3, 2005

(54) REFLECTOR TELESCOPE

(75) Inventor: Peter Wise, Leicestershire (GB)

(73) Assignee: Cape Instruments Ltd., Warwickshire (GB)

( * ) Notice: Subject to any disclaimer, the term of this patent is extended or adjusted under 35 U.S.C. 154(b) by 0 days.

(21) Appl. No.: 10/221,731

(22) PCT Filed: Apr. 12, 2001

(86) PCT No.: PCT/GB01/01675

§ 371 (c)(1),
(2), (4) Date: Oct. 7, 2002

(87) PCT Pub. No.: WO01/79909

PCT Pub. Date: Oct. 25, 2001

(65) Prior Publication Data

US 2003/0053204 A1 Mar. 20, 2003

(30) Foreign Application Priority Data

Apr. 13, 2000  (GB) .............................................. 0008958

(51) Int. Cl.[7] .......................... G02B 23/00; G03B 13/00
(52) U.S. Cl. ...................... 359/364; 359/389; 359/637; 359/744
(58) Field of Search ................................ 359/362–367, 359/725–732, 857–871, 399–410, 637, 744

(56) References Cited

U.S. PATENT DOCUMENTS

| 3,180,217 | A | * | 4/1965 | Argyle et al. ................ 359/730 |
| 3,256,766 | A | * | 6/1966 | Allesson ..................... 356/5.01 |
| 3,899,145 | A | * | 8/1975 | Stephenson ................. 244/3.13 |
| 4,275,949 | A | * | 6/1981 | Jones .......................... 359/209 |
| 4,278,330 | A | * | 7/1981 | Buchroeder ................. 359/676 |
| 4,331,390 | A | * | 5/1982 | Shafer ......................... 359/731 |
| 4,342,503 | A | * | 8/1982 | Shafer ......................... 359/729 |
| 4,477,156 | A |   | 10/1984 | Gabelein et al. ............. 359/364 |
| 4,571,036 | A |   | 2/1986 | Gabelein et al. ............. 359/364 |
| 4,718,753 | A |   | 1/1988 | Gabelein ..................... 359/364 |
| 4,746,798 | A | * | 5/1988 | Amon et al. ........... 250/339.02 |
| 4,881,801 | A |   | 11/1989 | Gabelein ..................... 359/364 |
| 4,883,348 | A | * | 11/1989 | Spivey et al. ............... 359/857 |
| 5,107,369 | A | * | 4/1992 | Hendrickson et al. ...... 359/399 |

FOREIGN PATENT DOCUMENTS

| JP | 55-79405 | * | 6/1980 | .................. 359/364 |
| WO | WO 94/16351 |   | 7/1994 | |

* cited by examiner

Primary Examiner—Thong Q. Nguyen
(74) Attorney, Agent, or Firm—Oliff & Berridge, PLC

(57) ABSTRACT

A compact reflector telescope has a spherical primary reflector and a secondary reflector with a negative lens interposed there between in axial alignment therewith. Light reflected from the primary reflector is passed through the negative lens and is diverted by the secondary reflector to a positive lens at the side of the telescope tube. The positive lens focuses the light rays onto an eye piece or ocular or onto a photographic emulsion or electronic detector. The telescope reduces or substantially eliminates spherical aberration and can be configured to have a focal ratio significantly greater than the focal ratio of the primary reflector. The telescope produces a flat field of view and an image which is substantially diffraction limited.

6 Claims, 4 Drawing Sheets

REFLECTOR TELESCOPE

BACKGROUND

1. Field of the Invention

The present invention relates to a reflector telescope and particularly, to a catadioptric reflector telescope employing a spherical primary reflector having a relatively short focal length and which reduces or substantially eliminates the problems conventionally associated with the use of spherical mirrors in reflector telescopes.

2. Description of the Prior Art

Reflector telescopes generally employ a concave primary reflector which collects and focuses light incident upon the reflector surface through the telescope's aperture and a smaller secondary reflector to direct the reflected light to the telescope's eyepiece. Normally, the primary reflector is provided by a paraboloidal mirror which has certain advantages in terms of imaging, the most important being that all parallel rays of light incident on the mirror are convergent at the focal point of the mirror, irrespective of the distance of the point of incidence from the central axis of the mirror. The result is that the focussing ability of parabolic or parabolical mirrors is generally good, even if the focal length of the primary mirror is short.

However, the use of paraboloidal mirrors in reflector telescopes does have certain disadvantages. Firstly, the image is strongly distorted towards the edge of the field of view—an aberration of the reflector known as coma in which the image of a point lying off the axis of the reflector has a comet-shaped appearance—making such telescopes unsuitable for photography. Moreover, coma is more strongly pronounced as the focal length of the primary reflector is reduced so that long focal length reflectors must be used if the effect is to be minimised, thus resulting in a longer overall length of the telescope. In addition, the manufacture of paraboloidal mirrors is difficult and expensive.

The above disadvantages are overcome by the use of a spherical primary reflector in place of a paraboloidal one. Spherical mirrors are considerably easier and cheaper to manufacture than paraboloidal mirrors and they do not generate coma distortion and are therefore suitable for photographic purposes.

However, the use of spherical primary reflectors in reflecting telescopes also presents a number of disadvantages. While coma distortion is not present, spherical mirrors suffer from a defect known as spherical aberration in which the rays of light incident on the mirror come to a focus in slightly different positions rather than a common focal point. Full size correctors are therefore normally required to compensate for this defect, as in the case of, for example, the Maksutov telescope and the Schmidt camera. Naturally, this results in manufacturing difficulties and increased expense. Moreover, spherical aberration varies inversely with the cube of the focal length of the mirror so that, again, the manufacture of compact telescopes is extremely difficult. Increasing the focal length of the primary reflector in order to compensate for spherical aberration increases the length of the telescope. These instruments also normally have a very large central obstruction, which degrades the image by transferring some of the energy in the Airey disc to the diffraction rings. Maksutov and Schmidt/Cassegrain telescopes also have a third reflection normally through a hole in the primary mirror and thus have an inconvenient observing position.

In general, therefore, the disadvantages of spherical reflectors outweigh those of paraboloidal mirrors and it is the latter that are therefore more commonly used in reflector telescopes. If the disadvantages associated with spherical mirrors could be reduced or substantially eliminated, however, then the use of spherical mirrors in reflector telescopes would be of considerable advantage.

SUMMARY OF THE INVENTION

It is an object of the present invention, therefore, to provide a reflector telescope which employs a spherical primary reflector but which reduces or substantially eliminates spherical aberration whilst being both compact and relatively inexpensive to produce. It is a further object of the invention to provide a reflecting telescope which is diffraction limited and which produces a generally flat field of view.

There is provided a catadioptric reflector telescope comprising:

a generally cylindrical primary tube;

a spherical primary reflector;

a planar secondary reflector directed generally towards the primary mirror, and angled at approximately 45° to reflect the light rays towards a side of the tube;

first correcting means; and second correcting means;

wherein the first correcting means comprises a negative lens positioned between the primary reflector and the secondary reflector at a distance from the primary reflector such that all reflected rays from the primary reflector are converging when they are collected by the first correcting means, and the second correcting means comprises positive lens positioned such parallel rays reflected from the secondary reflector are collected by the positive lens which focuses the rays toward an image plane.

Preferably, the viewing means is a sub-aperture lens having a diameter less than or equal to 35% of the diameter of the primary reflector. More preferably, the sub-aperture lens has a diameter of between 15% and 25% of the aperture of the primary reflector.

Preferably the image plane is positioned at a distance from the second correcting means greater than the focal length of the second correcting means such that the light rays collected by the image plane are diverging.

BRIEF DESCRIPTION OF THE DRAWINGS

The present invention will now be described, by way of example only, with reference to the accompanying drawings in which.

DETAIL DESCRIPTION OF THE PREFERRED EMBODIMENT

Figure 1:
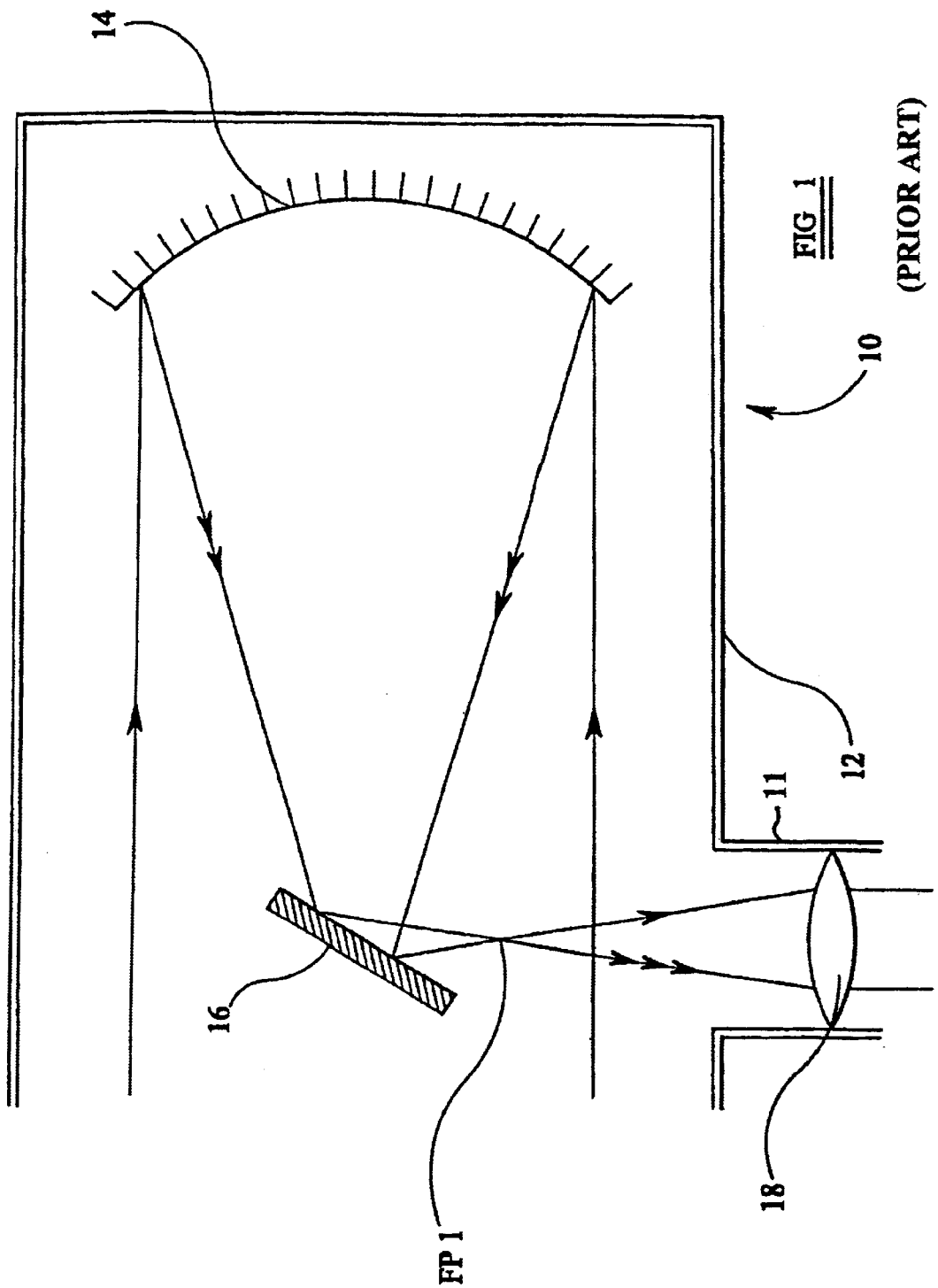
FIG. 1 is a simplified diagram of a conventional Newtonian reflecting telescope.

In FIG. 1, a simplified diagram of a conventional Newtonian reflecting telescope is shown generally at 10. The telescope consists of a generally elongate, cylindrical tube 12, open at one end thereof (or otherwise provided with an optical window) to allow the passage of light rays from a distant object into the telescope. A primary reflector in the form of a concave mirror 14, usually paraboloidal in shape, is mounted at the other end of the tube with its reflective surface directed towards the open end or optical window.

A secondary reflector in the form of a generally planar mirror 16 is mounted within the tube at a position between the open end of the tube and the primary reflector 14 with its reflective surface directed generally towards the primary reflector 14 but angled at 45° away from the central axis CA of the primary reflector 14. A lens 18 is mounted coaxially within a tube 11 arranged substantially at right-angles to the main tube 12 and serves as an ocular or eyepiece.

In use, light rays from a distance object enter the tube 12 via the open end or optical window with the rays being generally parallel. The parallel rays are incident upon the primary reflector 14 and are reflected to converge on the focal point $FP_1$ of the primary reflector 14. In order to maximise angular magnification of the telescope, the primary reflector 14 has a focal length which is considerably longer than the distance between the primary reflector 14 and the secondary reflector 16.

The light rays reflected by the primary reflector 14 are therefore intercepted by the secondary reflector prior to convergence and are turned through 90° and reflected towards the ocular 18. The plane surface of the secondary mirror 16 causes the reflected rays to converge prior to incidence upon the ocular such that they are diverging when they strike the ocular 18. The ocular 18 refracts the secondary rays such that they are emitted from the ocular 18 substantially parallel. The parallel rays can thus be viewed by the retina.

As stated above, it would be advantageous to replace the paraboloidal reflector 14 with a spherical reflector in order to reduce the effects of coma inherent with paraboloidal reflectors. However, the use of a such a spherical reflector would give rise to the problems indicated above. More particularly, spherical aberration would cause some of the incident light to converge before being intercepted by the secondary reflector with the effect that some of the rays reflected from the primary reflector would be diverging on incidence with the secondary mirror and would not, therefore, be reflected towards the ocular. The resulting image would be highly distorted.

Figure 2A:
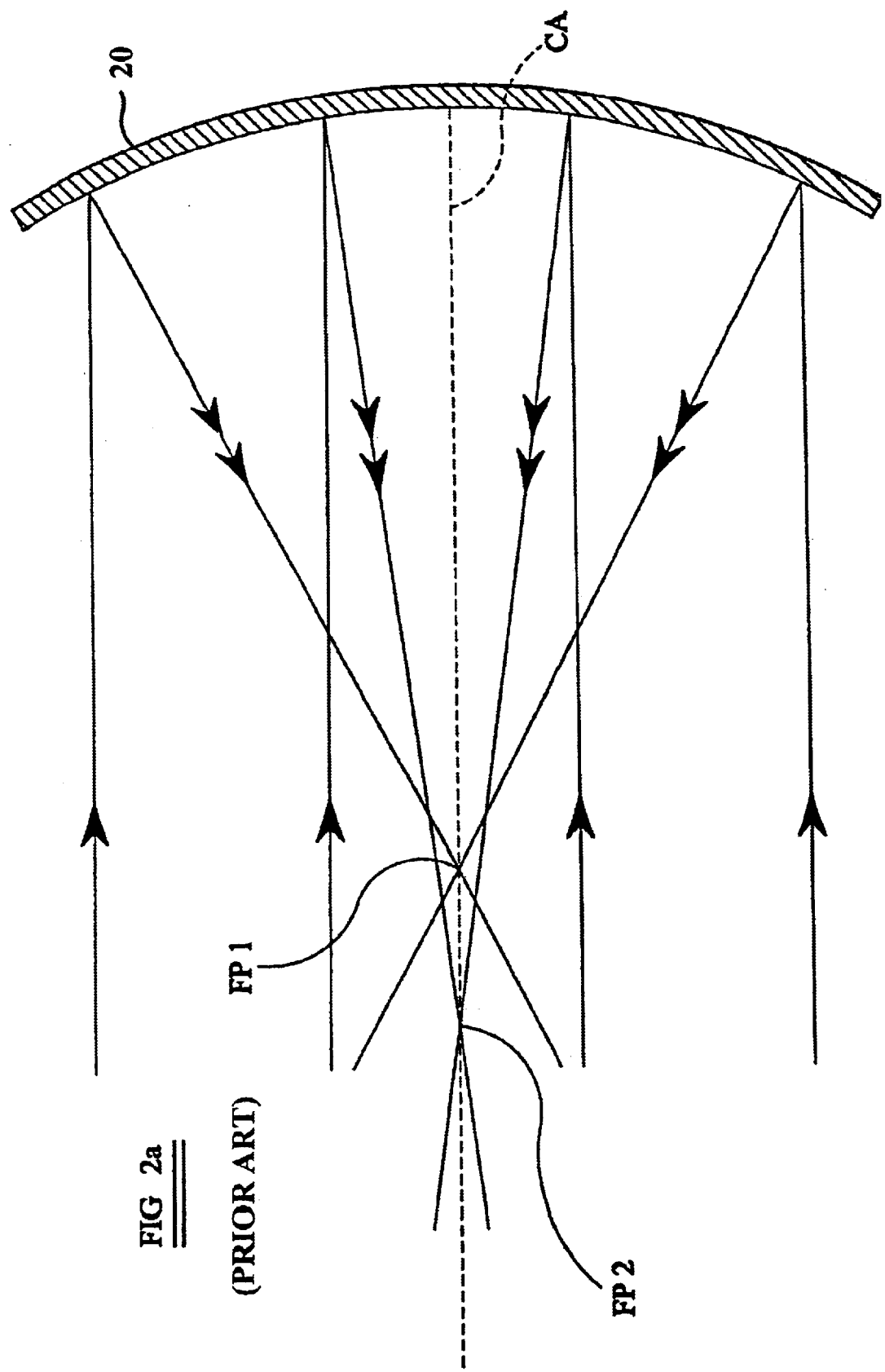
FIGS. 2a and 2b are ray diagrams illustrating the reflection characteristics of a spherical reflector.
Figure 2B:
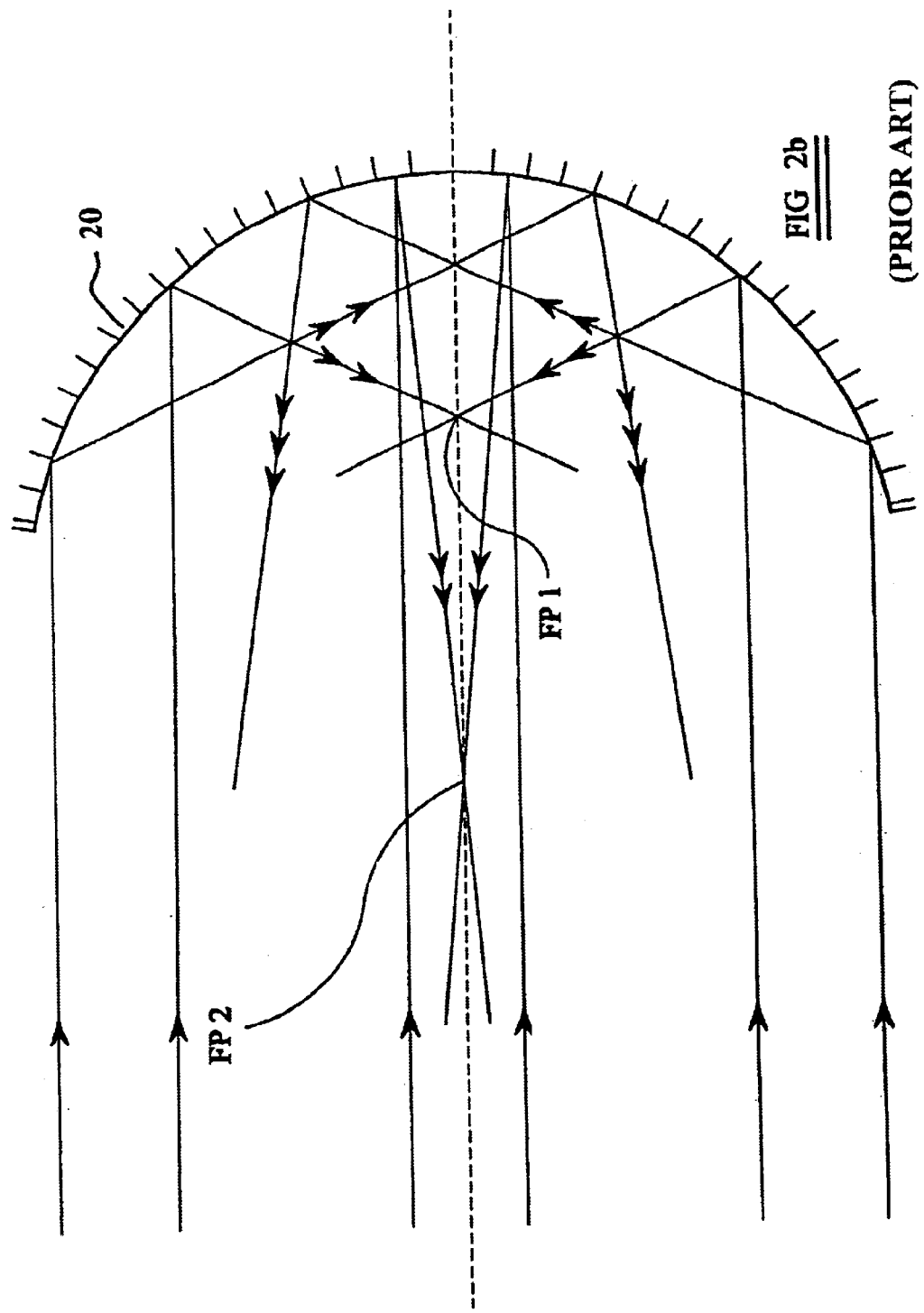

FIGS. 2*a* and 2*b* illustrate the reflective properties of a spherical mirror 20. Parallel light rays that are incident upon the mirror 20 at a position close to the central axis CA of the mirror are reflected through the focal point $FP_1$ as in the case of a paraboloidal mirror. However, rays, which are incident upon the mirror at positions further from the central axis CA, are reflected such that they miss the focal point. In fact, the further from the central axis the incident rays strike the mirror, the greater the distance by which the reflected ray will miss the focal point. Rays incident on the mirror at positions further from the central axis will be reflected such that they cross the central axis at positions close to the surface of the mirror itself.

As shown in FIG. 2*a*, spherical mirrors having a long focal ratio, for example $f_8$ and above, and those having relative small apertures, for example 0.1 m (4") or less, are not so greatly affected by this problem, although it is still noticeable, since the spread of the focal or convergence points of the reflected rays is relatively small. However, the use of reflectors having long focal lengths necessitates a long overall length of the telescope.

Use of a spherical reflector having a shorter focal ratio clearly reduces the length of the telescope but exacerbates the problem of spherical aberration. As shown in FIG. 2*b*, rays incident upon a reflector having a short focal length at a distance far from the central axis of the mirror can be reflected back onto the mirror itself before being finally reflected towards the secondary mirror. This produces severe distortion of the image.

Figure 3:
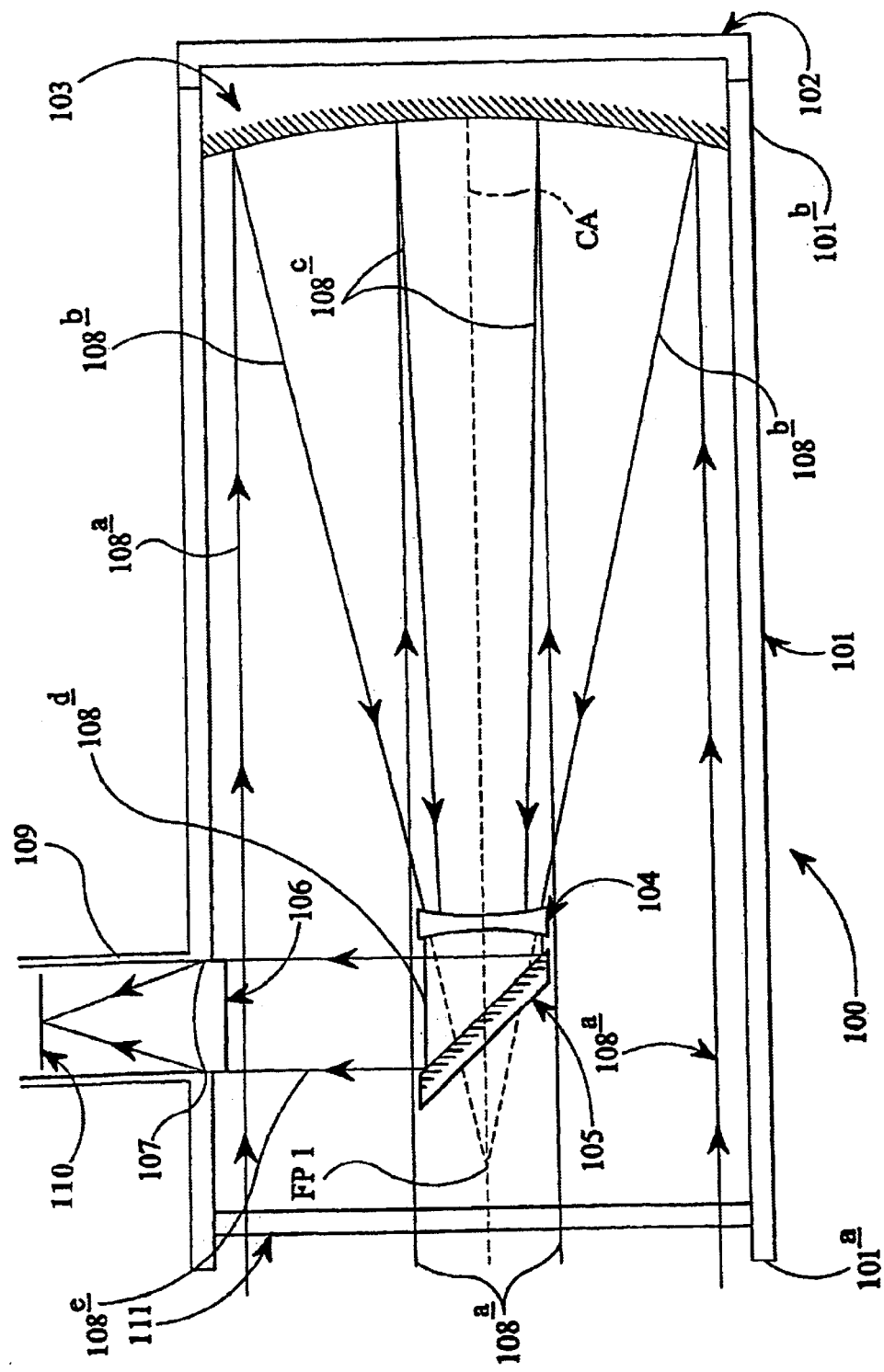
FIG. 3 is a section through a preferred form of telescope according to the invention.

FIG. 3 shows a section through a preferred form of telescope according to the invention which aims to allow the use of spherical reflector whilst addressing the problems associated therewith. Denoted generally at 100, the telescope comprises a generally cylindrical primary tube 101 having an aperture in the form of an optical window 111 at one end 101*a* thereof. The other end 101*b* of the tube 101 is optically closed by means of a cap or mounting 102. The concave spherical primary reflecting mirror 103 is mounted on the cap 102 by means of an adhesive or other mechanical means with its reflecting surface directed generally towards the aperture 111. In the preferred embodiment described, the concave spherical primary reflecting mirror 103 (hereafter primary mirror) has a focal ratio of $f_3$. Other advantageous though less preferred, focal ratios for the primary mirror are between $f_1$, and $f_5$.

An elliptical, planar secondary mirror 105 is mounted within the tube 101 in general alignment with the central axis CA of the tube and the primary mirror 103. The elliptical, planar secondary mirror (hereafter secondary mirror) 105 has its reflective surface directed generally towards the primary mirror 103 but is angled at approximately 45° away from the axis of the primary mirror 103 to cause light rays parallel to the central axis CA of the primary mirror to be reflected through 90° towards the side of the tube 101, as in the case of the earlier described Newtonian telescope. In the preferred embodiment, the secondary mirror is held in position within the tube 101 by means of a mechanical spider mounting (not shown). An alternative method of mounting the secondary mirror would be via a flat, full-aperture optical window.

A first correcting means in the form of a diverging or negative lens 104 is positioned between the primary mirror 103 and the secondary mirror 105, substantially coaxial with the tube 101. In the preferred embodiment, the negative lens 104 is mounted on the same mounting as the secondary mirror 105 but, clearly, alternative mounting means may be provided. In the preferred embodiment, the lens 104 is an achromatic doublet.

Second correcting means in the form of a converging or positive lens 106 is mounted in an aperture 107 in the side wall of the tube 101 and is arranged generally at right angles to the negative lens 104 and substantially in alignment with the central axis of the secondary mirror 105. The positive or converging lens 106 is mounted in the aperture 107 by a suitable adhesive or by any other suitable mechanical means.

A secondary tube 109 extends from the side of the primary tube 101, substantially perpendicular thereto and coaxial with the aperture 107. An eyepiece or ocular lens (not shown) is mounted within the secondary tube 109 in the manner of a conventional Newtonian telescope as described with reference to FIG. 1.

Operation of the telescope of FIG. 3 will now be described.

Light rays from a distant object enter the aperture of the telescope substantially parallel. These are shown generally at 108*a*. These rays 108*a* travel through the tube 101 and are incident upon the reflective surface of the primary mirror 103. Since the primary mirror 103 is concave, the rays 108*a* are reflected such that they converge towards the central axis CA of the primary mirror 103 and are shown at 108b, 108c. However, as stated above, rays 108a which strike the reflective surface of the primary mirror 103 at a distance from the central axis CA of the mirror will be reflected such that they converge more steeply with central axis of the mirror than those rays which strike the surface of the mirror closer to the central axis. In other words, parallel rays striking the mirror close to its perimeter will converge to a focal point $FP_1$ on the central axis CA of the primary mirror closer to the surface of the mirror than the focal point $FP_2$ of rays which strike the mirror close to its central axis.

The negative lens 104 is positioned at a distance from the primary mirror 103 such that all reflected rays from the primary mirror are converging when they are collected by the negative lens 104. In other words, the negative lens 104 is positioned at a point closer to the mirror than the focal point $FP_1$ of the most radially outward of the reflected rays.

The negative lens 104 serves to refract the incoming, converging rays 108b, 108c reflected from the primary mirror 103 such that the rays 108d emerging from the negative lens 104 are approximately parallel.

The parallel rays 108d emerging from the negative lens 104 are incident upon the planar mirror 105 and are caused to rotate through 90° by the 45° angle of the secondary mirror 105.

The parallel rays 108e reflected from the secondary mirror 105 are collected by the positive lens 106 which focuses the rays towards an image plane denoted at 110. In the embodiment of FIG. 3, the eyepiece or ocular (not shown) is positioned within the secondary tube 109 at a distance from the positive lens 106 greater than the focal length of the lens 106 such that the light rays collected by the eyepiece are diverging. The eyepiece thus focuses the diverging rays onto the retina of a user in the manner of a conventional eyepiece. Alternatively, a photographic emulsion or electronic detector, such as a charged-coupled device, may be positioned at the image plane 110 for photographic purposes. The lens 106 is preferably achromatic.

It will be appreciated that the present invention provides a telescope having all of the advantages associated with the employment of a spherical primary reflector but which reduces or substantially eliminates the problems conventionally associated with the use of such a reflector.

In particular, it will be clear to those skilled in the art that the use and configuration of the negative lens 104 and the positive lens 106 increases the effective focal length of the primary mirror 103 and hence the focal ratio of the telescope. In practice, the combination of the negative lens 104, the mirror 105 and the positive lens 106 can increase the effective focal ratio of the telescope 100 by up to 5 times or more. This large increase in effective focal ratio allows the actual focal length of the primary mirror 103 to be reduced which, as a consequence, reduces the overall length of the telescope. The use of a short-focus primary reflector together with the focal ratio-increasing lenses permits the overall tube length of the telescope to be short allowing the telescope to be able to be described as compact.

Prior art telescopes which employ spherical primary reflectors, such as the above mentioned Maksutov and Schmidt/Cassegrain telescopes, usually employ secondary reflectors which cause the light rays to be reflected through a hole in the primary mirror. The rays are therefore reflected along the length of the tube at least three times, resulting in a degradation in the image collected.

The effect of the secondary reflector causes an amplification of the primary reflector's focal ratio and overall focal ratios of these telescopes are usually around $f_{10}$, which is inconveniently large. A focal ratio of $f_6$ or below is usually preferred.

The present invention advantageously employs a primary reflector having a focal ratio between $f_1$ and $f_5$ and, more preferably, a focal ratio of $f_3$. However, the disadvantages associated with the use of a short focal ratio spherical primary reflector in term of increased spherical aberration is considerably reduced or substantially eliminated by the use and positioning of the negative lens 104. The exact position of the negative lens 104 is not crucial although certain considerations must be taken into account when determining the optimum position.

As will be appreciated by those skilled in the art, the nearer the negative lens 104 is placed to the primary mirror, the better refractive performance it will provide. However, in order to intercept all of the reflected rays from the primary mirror, the closer to the mirror the negative lens 104 is positioned, the larger in diameter it is required to be. There is therefore a trade-off between placing the lens 104 close enough to the primary mirror 103 to provide good refractive performance whilst being far enough away from the mirror to enable it to be relatively small in diameter yet still collect all of the light reflected from the primary reflector.

In practice, the diameter of the negative lens 104 is less than 35% of the aperture of the primary mirror 103 and more preferably in the range of between 15 and 25% of the aperture in order to reduce the diffraction effects caused by a large central obstruction. However, it is preferred that the negative lens be positioned closer to the primary mirror 103 than the first focal point $FP_1$ of the reflected rays 108b, 108c from the primary mirror 103 to ensure that all reflected rays collected by the negative lens 104 are converging.

All of the optics within the telescope are spherical, enabling the telescope to be suitable for the purposes of photography and further greatly reduces the cost of manufacture thereof. Furthermore, the arrangement of the primary reflector and the negative and positive lenses provides the considerable advantage that a flat field of view is generated at the focal plane 110 and the small central obstruction means that the image has more energy in the Airey disc and reduced energy in the diffraction rings.

It will also be appreciated by those skilled in the art of optical design that the telescope of the present invention can simply, and without the exercise of inventive thought, be configured to ensure any errors are limited to within the Airey disc or, in other words, diffraction limited.

While in the drawings, the negative and positive lenses 104, 106 are shown as single lenses, they are preferably in the form of achromatic doublets. However, they may take any suitable form such as single lenses, triplets or multilayer lenses provided that they provide the functions described above.

What is claimed is:

1. A catadioptric telescope comprising:

a generally cylindrical primary tube;

a spherical primary reflector;

a planar secondary reflector directed generally toward the primary reflector, and angled at approximately 45° to reflect light rays toward a side of the tube;

first correcting means; and second correcting means, wherein the first correcting means comprises a negative lens positioned between the primary reflector and the secondary reflector at a distance from the primary reflector such that all reflected rays from the primary reflector are converging when they are collected by the first correcting means; and the second correcting means comprises
a positive lens positioned such that parallel rays reflected from the secondary reflector are collected by the positive lens which focuses the rays toward an image plane.

2. The telescope as claimed in claim 1, wherein the image plane is positioned at a distance from the second correcting means greater than the focal length of the second correcting means such that the light rays collected at the image plane are diverging.

3. The telescope as claimed in claim 1, wherein the negative lens is a sub-aperture lens having a diameter less than or equal to 35% of the diameter of the primary reflector.

4. The telescope as claimed in claim 3, wherein the sub-aperture lens has a diameter of between 15 and 25% of the aperture of the primary reflector.

5. The telescope as claimed in claim 4, wherein the image plane is positioned at a distance from the second correcting means greater than the focal length of the second correcting means such that the light rays collected at the image plane are diverging.

6. The telescope as claimed in claim 3, wherein the image plane is positioned at a distance from the second correcting means greater than the focal length of the second correcting maans such that the light rays collected at the image plane are diverging.

* * * * *